United States Patent
Asrar et al.

(10) Patent No.: US 6,201,083 B1
(45) Date of Patent: Mar. 13, 2001

(54) MODIFIED POLYHYDROXYALKANOATES FOR PRODUCTION OF COATINGS AND FILMS

(75) Inventors: Jawed Asrar, Chesterfield, MO (US); Pol D'Haene, Kessel-Lo (BE)

(73) Assignee: Monsanto Company, St. Louis, MO (US)

( * ) Notice: Subject to any disclaimer, the term of this patent is extended or adjusted under 35 U.S.C. 154(b) by 0 days.

(21) Appl. No.: 09/609,878

(22) Filed: Jul. 5, 2000

Related U.S. Application Data (63) Continuation of application No. 09/156,147, filed on Sep. 18, 1998, now Pat. No. 6,096,810
(60) Provisional application No. 60/059,670, filed on Sep. 18, 1997.

(51) Int. Cl.[7] ............................. C08K 5/14; C09D 167/04
(52) U.S. Cl. .................. 526/238.3; 560/127; 528/295.5; 528/300; 528/308
(58) Field of Search ......................... 526/238.3; 560/127; 528/295.5, 300, 308

(56) References Cited

U.S. PATENT DOCUMENTS

| | | | |
|---|---|---|---|
| 4,486,377 | 12/1984 | Lucchesi et al. | 264/510 |
| 4,774,293 | 9/1988 | Beijleveld et al. | 525/298 |
| 5,037,892 | 8/1991 | Hogt et al. | 525/298 |
| 5,266,422 | * 11/1993 | Reusch et al. | 429/192 |

FOREIGN PATENT DOCUMENTS

| | | |
|---|---|---|
| 95/18169 | 7/1995 | (WO) . |

OTHER PUBLICATIONS

Cavallaro, Pasquale et al. (1993) "Reactive blending of bioaffine polyesters through free–radical processes," *Die Angewandie Makromolekulare Chemie* 210:129–141.

de Konig, G. J. M. et al. (1994) "A biodegradable rubber by crosslinking poly(hydroxyalkanoate)from *Pseudomonas oleovorans,*" *Polymer* 35(10):2090–2097.

Grimaldi, M. et al. (1996) "Reactive processing—property relationships in biodegradable blends useful for prosthesis application," *J. Mater. Sci.* 31(23):6155–6162.

Immirzi, Barbara et al. (1994) ". . . Blending of Bioaffine Polyesters Through Free–Radical Processes Initiated by Organic Peroxides," *Macromol Sympo.* 78:242–258.

Scherer, Thomas M. et al. (1994) "Characterization and Enzymatic Degradation of a Cross–Linked Bacterial Polyester," *J. of Enviromental Polymer Degradation,* 2(4):263–269.

International Search Report for PCT/US 98/19461.

* cited by examiner

*Primary Examiner*—Nathan M. Nutter
(74) *Attorney, Agent, or Firm*—Jon Beusen; Howrey Simon Arnold & White, LLP (57) ABSTRACT

Compositions are provided which are useful in the production of polymeric products, such as coatings and films, which comprise branched PHA. The compositions of the invention comprise PHA and 0.001–0.5 wt. % of a free radical initiator. The invention further provides methods of using the compositions for the efficient and cost effective production of films and coatings by reducing draw resonance and neck-in behavior of extruded PHAs.

3 Claims, 8 Drawing Sheets

MODIFIED POLYHYDROXYALKANOATES FOR PRODUCTION OF COATINGS AND FILMS

This is a continuation of application U.S. Ser. No. 09/156,147, filed Sep. 18, 1998 and now U.S. Pat. No. 6,096,810, herein incorporated by reference in its entirety, which claims the benefit of priority of United States Provisional Application Ser. No. 60/059,670, filed Sep. 18, 1997.

BACKGROUND OF THE INVENTION

This invention broadly concerns modified polymer compositions and methods for their use in the preparation of polymeric end-products. In particular, the invention relates to a process for covalently cross-linking polyhydroxyalkanoate (PHA) polymer molecules so as to produce branched PHA compositions suitable for use in the production of PHA coatings, films and moldings.

There has been considerable interest in recent years in the use of biodegradable polymers to address concerns over plastic waste accumulation. The potential worldwide market for biodegradable polymers is enormous (>10 B lbs/yr). Some of the markets and applications most amenable to the use of such biopolymers involve those having single, short use applications, including packaging, personal hygiene, garbage bags, and others. These applications, although poorly suited for recycling, are ideally suited for biodegradation through composting.

PHA biopolymers are polyesters produced by numerous microorganisms in response to nutrient limitation. The commercial potential for PHA spans many industries, and is derived primarily from certain advantageous properties which distinguish PHA polymers from petrochemical-derived polymers and other polymers derived from renewable resources, namely excellent biodegradability and/or natural renewability compared to the petrochemical-derived polymers, and hydrophobicity compared to other polymers derived from renewable resources.

Widespread use and acceptance of PHAs, however, has been hindered by difficulties in developing acceptable means by which these biodegradable polymers can be efficiently and economically processed into commercially attractive products. In addition, many characteristics of PHA-derived products, such as ductility, flexibility and elongation, are rapidly lost over time. This "aging" of PHA-derived products is unacceptable for many applications in that the products fail to maintain adequate structural integrity for their intended useful life. Thus, the success of PHA as a viable alternative to both petrochemical-derived polymers and to non-PHA biodegradable polymers, will depend upon novel approaches to overcome the unique difficulties associated with PHA polymer processing and with products derived therefrom.

One important application of biodegradable polymers is in the area of films and coatings for packaging and one-time use applications. Coatings, for example, are typically made by melting a polymeric material and extruding the melt through a die onto a substrate such as paper or board. Extrusion coating of PHA polymers, however, has typically required coextrusion with a non-PHA polymeric sacrificial layer such as polyethylene, resulting in a coated material which comprises a paper layer, a PHA layer, and a sacrificial layer. The use of a sacrificial layer during PHA processing has been necessary to provide sufficient melt stability and adhesion of the PHA coating to the paper surface and to allow the coatings to be processed at commercially desirable line speeds. Typically, the sacrificial layer is subsequently stripped from the PHA coated paper. It is important from a commercial standpoint to develop compositions and methods for cost-effective extrusion operations which do not depend on the use of a sacrificial non-PHA polymeric layer, and which provide PHA films and coatings having good physical and mechanical properties.

SUMMARY OF THE INVENTION

The present invention broadly concerns PHAs modified to contain branching, also known as cross-linking, in their polymer backbone. The branched PHA compositions of this invention are produced by melting PHAs in the presence of low levels of free-radical initiators under conditions which cause their decomposition into free radicals. The free radicals stimulate inter-chain cross-link formation between linear PHA molecules giving rise to the branched PHA compositions of the invention. Branched PHAs can provide significant cost benefits when used for production of PHA-derived articles, particularly coatings and films, by maximizing throughput while minimizing excessive waste of materials. Furthermore, products produced from the branched PHAs of the invention have improved physical, mechanical and aging characteristics relative to those produced from unmodified, linear PHAs.

In one aspect of the invention, there are provided polymeric compositions comprising PHA and 0.001 to 0.5% of a peroxide or other suitable free radical initiator. The compositions can be in any suitable form, for example, powder, granules, pellets, latex, solution etc. During processing into a desired PHA end-product, the compositions are exposed to temperatures above the melting point of the PHA and above the decomposition temperature of the peroxide for a length of time sufficient to cause PHA cross-linking to be present in the resulting product.

In accordance with another aspect of the present invention there are provided polymeric pellet compositions comprising branched PHA and methods of making the pellet compositions. The compositions can be produced by melting PHA in the presence of a free radical initiator in an amount sufficient to cause the desired PHA branching. Preferably, the free radical initiator is an organic peroxide present at between 0.001 to 0.5 wt. % of the PHA. During pellet production, the peroxide is exposed in the melt to temperatures above its decomposition temperature for a length of time sufficient to generate the free radical decomposition products of the peroxide and to thereby stimulate PHA cross-linking. The melt is typically extruded as a continuous strand, cooled and crystallized, and cut into pellets comprising branched PHA.

In accordance with another aspect of the invention, there are provided methods of using the PHA compositions of the present invention in the production of PHA end-products. Branched PHA compositions of the invention are advantageous for use in any thermal processing operation where good extensional rheology is important. The compositions are useful in extrusion coating, film and sheet formation, foams, thermoforming etc. In a particularly important application, there is provided a method of making PHA films and coatings which do not require the use of non-PHA polymeric sacrificial layers and which can be produced under efficient and economical processing conditions. The films and coatings can be made by melting a polymeric composition of the present invention and extruding the melt as an unsupported film or onto a substrate support. When the compositions of the present invention are used in melt extrusion operations such as these, they provide numerous advantages not achievable with linear PHAs. For example, they significantly reduce neck-in behavior typical of these processes, thereby increasing yield by reducing waste. In addition, the products so produced have improved ductility and display less age-related embrittlement over time.

In another aspect of the invention, there is provided an extrusion coating process wherein a stream of air or other suitable medium is directed against a polymer web after the web leaves the extrusion die but before it contacts the substrate to be coated. This method allows extrusion coating operations to be performed at significantly higher line speeds by reducing the draw resonance and neck-in of the polymeric material. In addition, the method reduces the critical coat weight of the polymer that is required for acceptable substrate adhesion.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

DETAILED DESCRIPTION OF ILLUSTRATIVE EMBODIMENTS

Polyhydroxyalkanoates:

Polyhydroxyalkanoates (PHAs) are biodegradable polymers or copolymers having the following general structure for one or more of the repeating units:

(I)

where a is 0 to 6, b is 0 to 15, Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc., and n is an integer. The pendant groups of the repeating units may contain additional functionalization such as double bonds, epoxidized double bonds, hydroxyl groups, alkyl groups, alkenyl groups etc. or combinations thereof. The polymer main chain can contain up to 8 carbons in the repeating units and there may be additional functionalization in or on the main chain such as double bonds, alkyl groups, alkenyl groups, hydroxyl groups etc. or combinations thereof.

The PHA is preferably one capable of being biologically produced, for example in a plant or microbial organism. Most typically, it is a fermentation product, particularly of a microbiological process, whereby a microorganism lays down polyhydroxyalkanoate during normal or manipulated growth. Manipulation may be achieved by removing or failing to produce one or more nutrients necessary for cell multiplication. Numerous microbiological species are known in the art to be suitable for the production of polyhydroxyalkanoate polymers (see for example, Anderson and Dawes, Micro. Rev. 54 (4): 450–472, 1990). The microorganisms may be wild type or mutated or may have the necessary genetic material introduced into it, for example by any of the methods of recombinant DNA technology. It is to be emphasized that it is not necessary for the PHA-producing organism to be a microorganism, but at present such organisms are preferred.

The PHAs preferably have as constituents hydroxyalkanoate (HA) monomers which are substrates for PHA synthase enzymes. Biologically-produced PHA polymers are the product of PHA synthase microbial enzymes, and are produced in either a bacterial cell which naturally contains a PHA synthase, or in a bacterial or other cell type, for example a plant cell, which has been genetically engineered to express such an enzyme. The microbial PHA synthase enzymes have broad substrate ranges and are capable of incorporating a large number of HA monomers as constituents of biosynthetic PHA depending upon growth conditions, precursor substrate availability, and the source of the PHA synthase enzyme. The diversity in composition of biosynthetic PHA polymers is underscored by the fact that at least 91 HA monomers have been identified as substrates for PHA synthases (Steinbuchel, A. and Valentin, H. FEMS Micro. Letters 128 (1995) 219–228).

Suitable HA monomers can include those having the following formula:

where a is 0 to 6, b is 0 to 15 and Y is H, F, Cl, Br, CN, OH, $CO_2H$, $CO_2R$ (where R is alkyl, benzyl etc.), methyl, cyclohexyl, phenyl, p-nitrophenoxy, p-cyanophenoxy, phenoxy, acetoxy, vinyl, 2-propyl, 2-butyl, 2-pentyl, 2-hexyl, etc. As in the above description, there may be additional functionalization in or on the pendant and/or main chains. The monomers can be homopolymerized or copolymerized either biochemically or synthetically to produce the polymer.

Preferred HA monomers include those where a=1–4, b=0–15, and Y is H. More preferably, the monomers are those where a=1–2 and b=0–3, and Y is H.

In a most preferred polymer, the PHA is of formula (I) where a is 1, b is 1 or 2 and Y is H and especially where there are units with b=1 and b=2 copolymerized together. Suitable polyesters contain a preponderance of b=1, especially with at least 70 mol % of such units, the balance being units in which b=2. Polymer containing a=1, b=1, Y=H as the only units is polyhydroxybutyrate (PHB) polyester while that containing additionally b=2 is polyhydroxy-butyrate-co-valerate (PHBV).

The polymer can also be a blend of two or more PHAs differing in the value of m. A particular example contains:

a) polymer consisting essentially of Formula I units in which 2–5 mol % of units have a=1, b=2 and Y=H, the rest a=1, b=1, and Y=H, and b) polymer consisting essentially of Formula I units in which 5–30 mol % of units have a=1, b=2 and Y=H, the rest a=1, b=1, and Y=H.

The proportions of the polymer in such a blend is preferably such as to give an average a=1, b=2 and Y=H content in the range 2 to 28 mol % and typically 4 to 18 mol %. Thus, in a most preferred form the polymer is a poly(hydroxybutyrate/valerate) copolymer or blend of copolymers.

As used herein, the term "molecular weight", unless otherwise specified, refers to the weight average molecular weight (Mw) as opposed to the number average molecular weight (Mn). Most synthetic polymers have a broad distribution of molecular weights, and the molecular weights reported for such polymers represent averages, most frequently defined by Mw or Mn according to the following formulas:

$$M_w = \sum_i n_i M_i^2 \bigg/ \sum_i n_i M_i$$

$$M_n = \sum_i n_i M_i \bigg/ \sum_i n_i$$

where $n_i$=the number of molecules of molecular weight $M_i$. The most commonly used technique for determining Mw and Mn is by gel permeation chromatography (GPC). This method is capable of determining the entire molecular weight distribution of a polymer sample from which molecular weight averages can be determined. Other methods known in the art for determining Mw and Mn include osmometry, scattering and sedimentation (See for example, W. R. Sorensen & T. W. Campbell: Preparative Methods of Polymer Chemistry, Interscience Publishers, NY, 1961)

PHA branching/cross-linking:

Branched PHAs can be made by reaction of linear PHAs with suitable reactive free radicals formed by the thermal homolytic decomposition of a free radical initiator. Once formed, the radicals can react with PHA molecules to generate radical sites on the polymer backbone which stimulate recombination reactions that form carbon—carbon bonds between different polymer molecules. Thus, bridges are created between PHA polymer molecules by means of interchain cross-link formation. The type of reaction thought to give rise to branched PHA in accordance with the present invention is shown below as a reaction of PHB with free radical R* where a and n are integers:

In one aspect of the invention, there are provided polymeric compositions comprising PHA and 0.001–0.5 wt. % of a chemical free radical initiator. The compositions can be in any form suitable or desired for a given application (powder, granule, pellet, latex, solution etc.). The PHA and the free radical initiator are combined by any suitable means under conditions in which the free radical initiator remains structurally intact (i.e., under conditions in which the initiator does not undergo substantial decomposition). Preferably, a free radical initiator is mixed with linear PHA powder or pellets using a high intensive mixing device so as to ensure homogeneous dispersion of the components. A carrier such as polyethylene, polypropylene, or minerals (for example calcium carbonate) may be used for improving dispersion of the free radical initiator. Alternatively, a free radical initiator can be dissolved in a volatile solvent and sprayed on PHA powder or pellets. Such an approach should involve sufficient mixing to ensure that the spray provides an even and thorough coating of the PHA.

The compositions of this aspect of the invention can be used in the production of polymeric objects/articles comprising branched PHA. This can be accomplished by appropriate selection of processing conditions such that the PHA and the free radical initiator are exposed to temperatures above the melt temperature of the PHA and above the decomposition temperature of the free radical initiator for a length of time sufficient to stimulate decomposition of the free radical initiator, and therefore PHA branching in the final product.

Although the PHA compositions of the invention can be in any suitable form convenient for an intended application, for most processes that produce thermoplastic polymer products such as films, coatings and molded articles, it is desirable to use a pellet form of a polymer or polymer blend already containing desired additives, modifications etc. This allows the polymeric material to be provided to the processor preformulated for a particular application. In addition, the use of pellets are advantageous in that they avoid problems with dust typically encountered when handling powders. Generally, such pellets are prepared by melt extruding a continuous strand of a polymer or polymer blend containing desired additives, such as nucleating agents, plasticizers etc., cooling and crystallizing the extruded strand, and cutting the strand into pellets.

Therefore, in another aspect of the invention, polymeric pellet compositions comprising branched PHAs are provided. The compositions can be produced by melting a PHA in the presence of a free radical initiator at a temperature above the decomposition temperature of the free radical initiator for a length of time sufficient to cause PHA cross-linking. As described above, the thermally-induced decomposition of the free radical initiator results in the production of reactive radicals which stimulate interchain cross-link formation between PHA molecules. Thus, the branched PHA pellets of this aspect of the invention can be made by reactive extrusion, wherein extrusion temperatures and residence times during pellet production are effective for melting the PHA and for causing the decomposition of the free radical initiator. As a result, PHA cross-linking occurs prior to or coincident with the melted strand leaving the extruder to be subsequently crystallized and cut into pellets.

It has been found that use of unexpectedly low levels of free radical initiator is sufficient for producing branched PHA compositions having improved ductility and processing characteristics compared with linear PHAs. For example, the amount of peroxide used in producing branched PHAs according to this invention is typically between 0.001 and 1.0 wt. % of the polymer, preferably between about 0.01 and 0.5 wt. %.

Suitable free radical initiators used in accordance with the present invention include but are not limited to chemical initiators such as peroxides, azo-nitriles, azo-derivatives, peresters and peroxycarbonates. Radiation, such as from an e-beam or gamma irradiation source, could also be used to stimulate PHA branching.

The selection of an appropriate chemical free radical initiator for use with PHAs may depend upon the decomposition temperature of the initiator and the polymer processing parameters, for example extruder residence times and the melt temperatures necessary for a given application. Depending upon the decomposition temperature of the free radical initiator, the timing of its addition, and the polymer used, some or all of the branching reaction may take place in the solid state. It is typically preferred, however, that the decomposition temperature of the free radical initiator be at or above the melting temperature of the PHA. In this way, the free radical initiator does not undergo substantial decomposition until the PHA has melted, allowing for a more homogeneous mass in which the branching reactions take place.

Suitable peroxides for use in the present invention include, but are not limited to, organic peroxides, for example dialkyl organic peroxides such as 2,5-dimethyl-2, 5-di(t-butylperoxy)hexane, 2,5-bis(t-butylperoxy)-2,5-dimethylhexane (available from Akzo as TRIGANOX 101), 2,5-dimethyl-di(t-butylperoxy)hexyne-3, di-t-butyl peroxide, dicumyl peroxide, benzoyl peroxide, di-t-amyl peroxide, t-butyl cumyl peroxide, n-butyl-4,4-bis(t-butylperoxy)valerate, 1,1-di(t-butylperoxy)-3,3,5-trimethyl-cyclohexane, 1,1-di(t-butylperoxy)cyclohexane, 1,1-di(t-amylperoxy)-cyclohexane, 2,2-di(t-butylperoxy)butane, ethyl-3,3-di(t-butylperoxy)butyrate, 2,2-di(t-amylperoxy) propane, ethyl-3,3-di(t-amylperoxy)butyrate, t-butylperoxy-acetate, t-amylperoxyacetate, t-butylperoxybenzoate, t-amylperoxybenzoate, di-tbutyldiperoxyphthalate, and the like. A single peroxide is typically suitable for use in the present invention, however two or more could be used if desired.

The most desirable free radical initiator for a given application can depend on the melting point of the polymer used and on the decomposition temperature of the initiator. References readily available to the skilled individual, such as the POLYMER HANDBOOK (3rd Edition, Eds. J. Brandrup & E. H. Immergut, John Wiley and Sons, 1989, Ch.2), contain tables of free radical generators, their decomposition temperatures and rates of decomposition in various solvents.

The length of exposure of a free radical initiator to a temperature above its decomposition temperature in a PHA melt does not have to be a rate limiting step in the extrusion of pellets, films, coatings etc. which contain branched PHA. Thus, if desired, the selection of the free radical initiator can be such that the kinetics of the PHA branching reaction are sufficiently rapid so that residence times and other extrusion processing parameters need not be substantially modified from those used for linear PHAs.

When producing branched PHA according to the present invention, there are competing reactions occurring in the melt; one reaction stimulating a reduction in PHA Mw and another stimulating an increase in PHA Mw. The former is caused by the well known thermosensitivity of PHAs when exposed to temperatures at or above their melting point. The latter is caused by the fact that when PHA molecules become covalently cross-linked, the resulting branched molecules are larger than the linear molecules they were produced from. Indeed, in other polymer systems where cross-linking has been introduced, it is typical to observe an increase in the Mw of the branched polymer compared to the linear polymer used as starting material. Under conditions employed in the production of the PHA compositions of the present invention, however, there is little net change in the molecular weight of the branched PHA polymers compared with the linear PHAs used to produced them. This is advantageous in that choice of extruder temperature and free radical initiator can be easily optimized to favor a reaction wherein good control of the resulting molecular weight is possible. Moreover, branching and molecular weight adjustments can be carried out in a single step.

The PHA compositions of the present invention are particularly well suited for the production of films, coatings and moldings. However, more generally, they can be used in the production of numerous other polymeric products, including but not limited to products made by spinning and calendering operations, general extruded parts, solution and melt spun fibers and foamed materials and products.

Coatings & Films

Extrusion operations are widely used in the production of polymeric films. Films can be supported (i.e., by a substrate such as paper or board) in which case they are referred to as coatings, or they can be unsupported, free-standing films.

Figure 1:
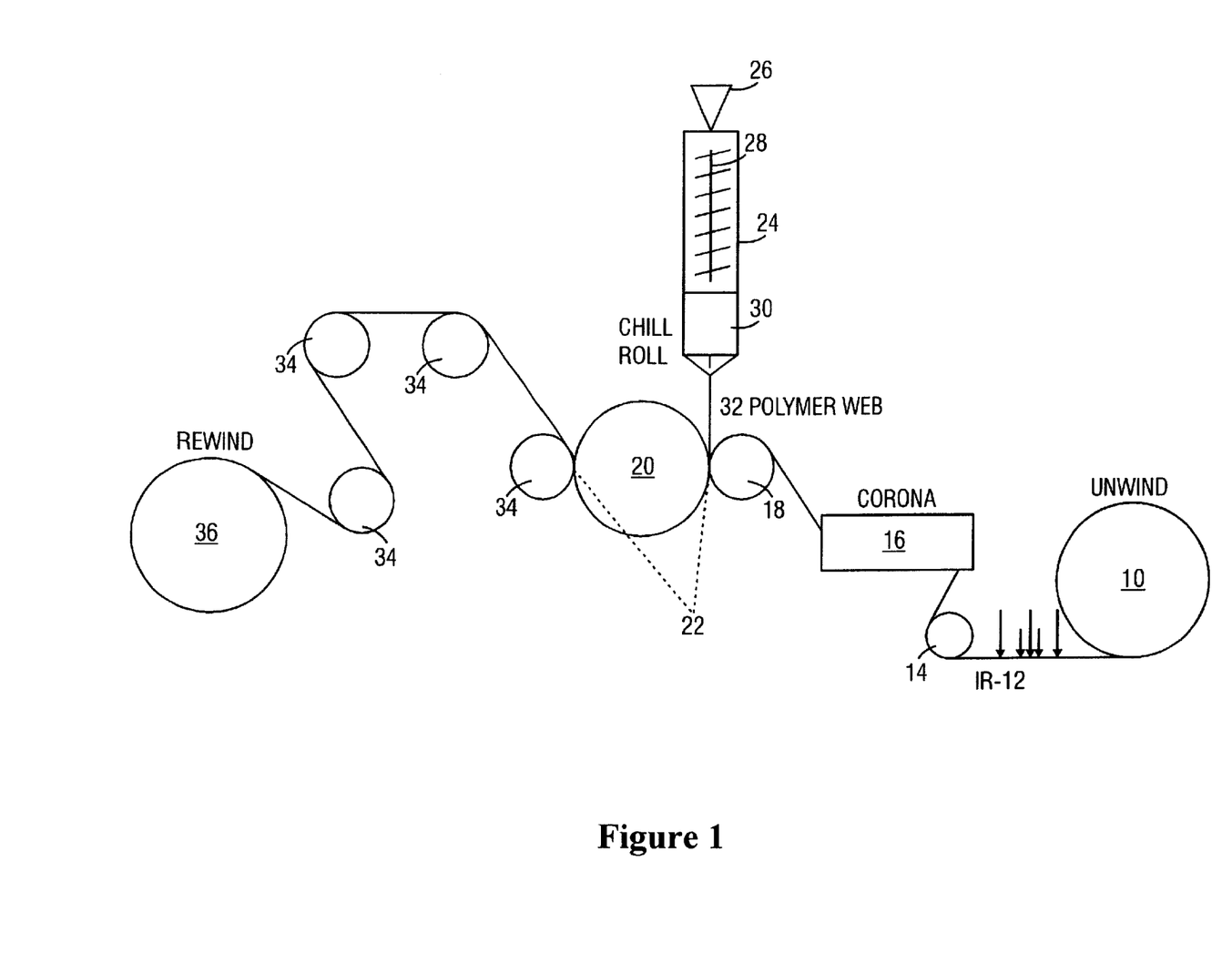
FIG. 1 illustrates a melt-coating process for coating paper with PHA.

FIG. 1 illustrates a typical melt/extrusion-coating process for coating paper or paperboard with PHA in which uncoated paper or board unwinding from reel 10 is dried by infrared heater 12 and if desired passed via roller 14 to a Corona treatment facility 16 for oxidizing and preparing functional groups on the paper that facilitates coating and adhesion of the resulting coat.

Melt-extruder 24 may have a hopper 26 by which a feedstock of preferably a PHA composition of the present invention is introduced into extruder 24 and processed by heated screw 28 which melts the PHA, for example at a temperature typically in the range of 160–210 deg.C., and causes the melted PHA to be extruded via die 30 in the form of a polymer web 32.

Polymer web 32 and paper from facility 16 are passed between roller 18, chill roller 20 maintained at a temperature less than that in extruder 24, and roller 34 which together form a cooling and contacting zone 22 under conditions of temperature, pressure and contact time in the zone for producing coated paper of desired characteristics. The coated paper can be further air cooled by passing over rollers 34 and wound onto take-up reel 36. The equipment shown in FIG. 1 and equivalent equipment for paper coating are well known to those of ordinary skill in the art of melt coating paper and need not be further described here.

PHAs frequently exhibit an unacceptable degree of neck-in during extrusion operations which can severely limit the yield of the final product. Neck-in refers to a contraction of the melt width upon leaving the die and represents the difference between the width of the die and the width of the polymeric coating on the substrate. Neck-in contraction generally increases with increasing line speeds, temperatures, and air gaps. The present invention has found that neck-in in the desirable range for commercial production of PHA-derived films and paper coatings can be achieved if the polymeric melt that is extrusion coated contains branched PHA.

The method by which a coating of the present invention is prepared and applied to an object/article to be coated generally involves the steps of melting a PHA composition of the invention, typically in a single screw extruder 24 as illustrated in FIG. 1, extruding the melted polymer through a T-shaped or a coathanger die 30, and applying the polymer web to the paper sheet surface. This polymer-paper laminate is generally supported by a cooling roll which is at a temperature between about 50 and 60° C. Finally the laminate is transferred to a winding installation which is producing rolls of coated board or paper.

The PHA composition fed into an extruder can be in various forms. For example, it could comprise PHA and peroxide or it could comprise PHA already branched as a result of a previous branching reaction. Alternatively, a blend or mixture of branched and linear PHAs could be used by appropriate selection of the concentration of branching in the branched PHA (dependent on the amount of free radical initiator used to produce the branched material) and the concentration of the branched PHA mixed and extruded with the linear PHA. When using this approach, it is preferred and perhaps necessary that a mixing screw or a twin screw extruder be used so that homogeneous blend is obtained during extrusion.

The molecular weight of the extruded PHA may influence the extent of improvements observed in coatings produced by this method. Although an unambiguous trend is not discernible at this point, it appears that as the Mw of the branched material is increased, greater reductions in neck-in may be achieved.

In addition to the production of coatings by extrusion, the compositions of the present invention are useful in the production of coatings (and films) made from latex PHA suspensions. For example, an aqueous latex suspension can be prepared so as to contain PHA particles in addition to 0.001–0.5 wt. % (based on PHA content) of a peroxide or other free radical initiator. Such suspensions can then be used to produce films and coatings by techniques well known to the skilled individual. One common approach, for example, involves applying the suspension to a substrate followed by a heating step at a temperature sufficient to cause the decomposition of the peroxide and sufficient to form a coherent polymer coating on the substrate.

The substrate on which a coating is applied may be any suitable material, such as paper, board or fabric, which may be knitted, woven or non-woven. In the case of a non-woven fabric, the melt may penetrate into the non-woven structure, following the contours of the fabric. The substrate could also be a film of a second polymer. The second polymer should be a compatible polymer if a multilayer film is required. The second polymer could also be a non-compatible sacrificial layer if it is to be stripped from the first. As discussed above, the present invention is advantageous in eliminating the need for such a sacrificial layer which prior to the present invention was typically necessary to obtain extruded PHA films and coatings with commercially desirable properties and processing characteristics.

The invention further provides cast free-standing PHA films prepared from molten preparations comprising branched PHA compositions. The film may be cast either onto a roller, as in certain chill-roll processes known from polyethylene casting, or the invention may use an adaptation of such a process, for example, using an endless belt instead of a roller. The film may then be stretched, if required, before or while heating of the film takes place.

In addition, given the increased melt strength of branched PHA compared to unmodified PHA, the compositions of this invention can also be advantageously used in producing blown films. Branching results in strain hardening during extension of the polymer melt. This increases the elongational stress in the material during stretching which increases the stability of the process. A higher bubble stability upon stretching increases the maximum deformation which is possible and can lead to the production of thinner films.

Air Blower Apparatus:

Extrusion coating operations similar to that described in FIG. 1 have been developed for a number of plastics, in particular low density polyethylene. The rheological behavior of low density polyethylene in the melt allows for extrusion coating at high line speeds (over 400 m/min). Polyhydroxyalkanoates, however, are linear polymers which tend to exhibit inferior extrusion coating characteristics, which can limit the attainment of high line speeds during processing. PHA melt extruded from an extrusion die exhibits draw resonance above a critical line speed. Draw resonance (or surging) refers to sustained periodic variations in the molten film occurring between the die and the rapid cooling zone. Thus, when the critical line speed is exceeded, undesirable fluctuations in coating thickness and/or melt breakage results.

In another aspect of the invention, there is provided a method of improving extrusion coating operations by reducing draw resonance, neck-in, and polymer coatweight when producing polyester films and coatings. This is accomplished by directing a stream of air or other suitable medium such as nitrogen, carbon dioxide etc., against a polymeric molten film/web after it leaves the extrusion die but before contacting the cooling/contacting zone. The approach can be carried out, for example, in a manner similar to that described in U.S. Pat. No. 4,486,377, which is incorporated herein by reference. Using this method, PHA film and coating extrusion operations can be performed at high line speeds, for example greater than 100 m/min, preferably greater than 200 m/min, due to reduced draw resonance. In addition, yield is improved as a result of reduced neck-in.

When coating a polymeric material on a substrate such as paper or board, good adhesion of the coating to the substrate is important. Adhesion can be measured by any one of the numerous tests of peel strength known to the skilled individual. For example, one such tape adhesion test comprises gently cutting a coating in the cross-extrusion direction with a sharp knife, so that only the coating is cut and not the substrate. Tape is then attached against the coating in the machine direction, so that it goes over the cut. The other end of the tape is left free for peeling, and the tape area around the cut is firmly pushed against the coating. The tape is then peeled off, and the evaluation made on a 0–5 scale, wherein 0: no bonding of coating to substrate; 1: coating peels off easily; 2: coating peels off but requires some force (no fiber tear); 3: coating peels off but requires strong force (some separate fibers may be stripped off), or coating will tear while peeled; 4: some fiber tear will occur and the coating may also tear while peeled; 5: total fiber tear, coating inseparable from substrate.

Adhesion of a polymer coating to a substrate generally increases with increasing coat weight up to a critical coat weight. Above this critical coat weight, however, adhesion does not substantially improve with further increasing coat weights. Thus, coat weights above the critical coat weight are typically desired for achieving optimal adhesion. However, from a cost of production standpoint, it is important to minimize coat weight so that less polymer is used without compromising the adhesion properties required for the intended application. It has been difficult with PHAs and other polyesters, without the use of a sacrificial layer, to achieve commercially acceptable adhesion properties with low polymer coat weights (i.e., less than 60 g/m$^2$).

The use of an air blower during extrusion coating operations unexpectedly provides a method by which the critical coat weight for optimal adhesion can be reduced Normally, the critical coat weight for PHAs is about 70 g/m$^2$ (see FIG. 8) However, it was observed that when using an air blower according to the present invention, critical coat weights can be decreased to less than 60, preferably less than 50 g/m$^2$ (FIG. 9). Thus, the invention provides for the first time a means for producing an extrusion coated object having peel adhesion strength greater than about 80 N/m while using a coat weight less than about 60 g/m$^2$.

By manipulating the pressure and temperature conditions of the blown air, the most extensive reduction in critical coat weight was achieved. In general, increasing the temperature of the air has the effect of further reducing the critical coat weight. The temperature is preferably greater than 30 deg.C., more preferably greater than 60 deg.C.

Substantial cost of production savings can be achieved with this aspect of the invention by making it possible to utilize less polymer for coating a substrate (i.e., lower coat weights) while maintaining the adhesive characteristics required of a commercially viable product.

Additives:

Various additives can be used in the production of the PHA compositions of the invention and/or the products derived therefrom. These can include any such additives known to the individual skilled in the art, for example, antioxidants, pigments, UV stabilizers, fillers, plasticizers, nucleating agents, radical scavengers etc. in amounts commonly used for these purposes.

A. Nucleants:

A variety of nucleants are suitable for use with the compositions described herein and the articles/objects produced therefrom. These could include, for example boron nitride (EP-A-0291024), organic phosphonic acid based systems such as the cyclohexylphosphonic acid/zinc-stearate system (U.S. Pat. No. 5,061,743), and other nucleant systems known in the art.

A preferred nucleant is one having the following structure:

where R can be hydroxy, hydrogen, C1–C25 alkyl groups (with or without one or more substituent groups such as —OH, —CO2H, —Cl, —Br, —NH2, —N(alkyl)H or N(alkyl)2), cycloalkyl groups, aryl or arylalkyl groups (such as phenyl, benzyl, etc. with or without substituents on the aromatic rings). Synthesis of such compounds can be achieved, for example, by reaction of organocarboxylic acids, PCl3 in an aqueous medium. The compounds and their syntheses have been described in the prior art for use as water treating chemicals, detergent ingredients, etc. (for example see U.S. Pat. No. 3,855,284, U.S. Pat. No. 3,400,147, U.S. Pat. No. 3,400,150, U.S. Pat. No. 4,254,063, Aus. 599,950, FR 1,521,961 and CA 93:182031). The synthesis can also be applied to dibasic acids such as adipic acid, succinic acid, etc. to give the corresponding tetrakis phosphonic acids (i.e., di-ODPAs) which can also be used as nucleants. For example, with adipic acid, 1,6-dihydroxy-1, 6-dihexanediylidene tetraphosphonic acid is obtained (Aus. 599950). Other compounds that can be used as nucleants include methylene diphosphonic acid (PL 131549) and carbonyl diphosphonic acid (CA 93:182031). Such compounds are herein sometimes referred to as organodiphosphonic acids or ODPAs, which is term intended to include both ODPAs and di-ODPAs. The ODPAs or di-ODPAs may also be formed in situ, for example by reaction of the corresponding phosphinic acid.

Preferred ODPAs include 1-hydroxy-lower alkylidene-1, 1-diphosphonic acids such as 1-hydroxyethylidene-1,1-diphosphonic acid (HEDP), 1-hydroxypropylidene-1,1-diphosphonic acid, 1-hydroxybutylidene-1,1-phosphonic acid, 1-hydroxycyclohexylidene-1,1-diphosphonic acid. In a most preferred nucleant, both acid moieties are phosphonic acid moieties, R1 is a methyl group and R2 is hydroxy group (i.e., HEDP). HEDP is available as a mixture of HEDP in water from Monsanto Company (800 N. Lindbergh, St. Louis, Mo. 63167) under the tradename DEQUEST 2010. The ODPA is used in amounts typically in the range of 0.01–5.0 phr (parts per hundred resin), preferably about 0.02–1.0 phr, most preferably about 0.02–0.5 phr.

The nucleants can further be metallic salts of ODPAs, preferably mono-metallic salts. However, it is generally preferred that not all, e.g., less than 70%, more preferably less than 60% of the phosphonic acid moieties are involved in the salt formation since it has been found that excessive salt formation may adversely influence the effectiveness of certain nucleants of the invention.

Organic metal salts and/or certain inorganic compounds can be used to further improve nucleation activity and/or reduce the extent of discoloration and/or improve the clarity of PHA-derived products when used in combination with the ODPAs of the invention. The organic metal salt is preferably an organic acid salt, more preferably a fatty acid metal salt. The inorganic compound is preferably an metal oxide, a metal hydroxide or a metal carbonate. Suitable metals include those selected from Groups I to V of the periodic table, preferably aluminum, antimony, tin, sodium, calcium, magnesium, barium or zinc. Most preferably the metal is one which has benign environmental and toxicological properties such as magnesium, calcium and barium. Preferred fatty acids include stearic acid, palmitic acid, acetic acid, propionic acid, caproic acid, oleic acid, behenic acid and montanic acid. Most preferably, the fatty acid metal salt of the invention is calcium stearate or magnesium stearate which have proven highly effective in combination with ODPAs in nucleating thermoplastic polyesters. The organic metal salt or the inorganic metal oxide, metal hydroxide or metal carbonate is used in an amount typically ranging from 0.001 to 5 phr (parts per hundred of resin), preferably about 0.005 to 2 phr, and most preferably about 0.01 to 0.5 phr.

A nucleant formulation preferably comprises organic metal salt (or inorganic metal oxide, metal hydroxide or metal carbonate) and ODPA in weight ratios of about 0.01:1 to 10:1, preferably about 0.05:1 to 7.5:1, and more preferably about 0.1:1 to 5:1. When calcium stearate is used in a preferred nucleant formulation, a 3:1 ratio has been found to provide a suitable solid support for the ODPA-solvent solution and to produce a PHA nucleant with desirable activity.

The weak organic base is one which is effective in improving the elongational properties and/or clarity of the polymeric material. The weak organic base should be polymer-miscible or -soluble and melt at a sufficiently high temperature so that, if desired, nucleating agent solvent can be readily removed during preparation. The weak organic base preferably comprises a mono-, bis-, or tri- fatty acid amide, as these generally exhibit good hydrolytic stability in the presence of ODPAs. More preferably, the weak organic base is a stearamide, for example ethylene bistearamide (EBS), available from Lonza or Henkel under the tradename Acrawax C or Loxamid EBS. The weak organic base is typically present in the polymeric compositions in an amount between about 0.01 to 9.0 phr, preferably between about 0.05 to 1.0 phr, most preferably about 0.1 to 0.5 phr.

Thus, a most preferred nucleant for use in this invention comprises HEDP/calcium stearate/EBS present in ratios effective for nucleating PHA and producing PHA articles having excellent clarity, color, elongational and tensile properties. Most preferably, the constituents of this formulation are present in weight ratios of about 0.8/1.5/1.7 respectively.

Suitable levels of such a nucleant formulation to be added to the PHA range from about 0.01 to 5.0 parts per hundred of resin (phr). Preferably, the level of the nucleant formulation is about 0.05–1.0 phr, and most preferably it is about 0.1–0.6 phr.

It is advantageous when preparing the nucleant to dissolve/suspend the ODPA, and optionally the organic metal salt (or inorganic metal oxide, metal hydroxide or metal carbonate) and/or the weak organic base, in an effective nucleating agent solvent. Preferably, the solvent is then removed, for example by evaporation under vacuum, giving rise to solids which are ground, pulverized, or otherwise treated so as to produce particles with diameters less than about 710 microns, preferably less than about 350 microns. The term "effective nucleating agent solvent" herein means a solvent which dissolves the ODPA and preferably enhances its nucleation activity but which does not intolerably reduce its effectiveness as a nucleant. Thus, the ODPA prepared using an effective nucleating agent solvent as described herein will have at least as effective nucleation activity, preferably greater nucleation activity, compared to the same ODPA that is not dissolved in an effective nucleating agent solvent during its preparation or use.

Nucleating agent solvents for use in this invention include but are not limited to C1 to C6 aliphatic mono, di- and triols such as methanol, ethanol, ethylene glycol, 1- or 2-propanol, propylene glycol, glycerol, 2-methyl-2-propanol, 2-butanol and the like, and further including mixtures of such solvents with each other and with water. Preferred nucleating agent solvents include methanol, ethanol or another lower alcohol, or mixtures of such alcohols with water to allow for easy solvent removal. The nucleating agent solvent needs to be appropriately selected since it has been found that some solvents such as acetone and tetrahydrofuran when used with some ODPAs such as HEDP are not effective nucleating agent solvents. However, it is known that mixtures of solvents, e.g. methanol and acetone, can serve as effective nucleating agent solvents as defined herein even though one of the solvents in the mixture is not an effective nucleating agent solvent when used alone. While all of the solvents which will be effective nucleating agent solvents have not yet been elucidated, a person skilled in the art can readily determine whether a proposed solvent for an ODPA is "effective" by routine experimentation following the description herein.

B. Plasticizers:

Any suitable plasticizer for PHAs could be used in the compositions of this invention. Examples of many such plasticizers are disclosed in WO 94/28061, and include:

(A) high-boiling esters of polybasic acids, such as
 (i) phthalates and isophthalates, particularly compounds of the formula:

where $R_1$ is $C_{1-20}$ alkyl, cycloalkyl or benzyl, preferably $C_{5-11}$ alkyl, cyclohexyl or benzyl, especially isoheptyl, isooctyl, isononyl, isodecyl and isoundecyl. For example di-isodecylphthalate (Jayflex DIDP*), di-isooctylphthalate (Jayflex DIOP*), di-isoheptylphthalate (Jayflex77(DHIP*), di-baptylphthalate, di-rindecylphthalate, di-isononylphthalate (Jayflex DNIP*), di-isoundecylphthalate (Jayflex DIUP*), di-isodecylphthalate (Reomol DiDP*), di-isobutylphthalate (Reomol DiBP*) di-tridecylphthalate, butyl benzyl phthalate (Ketjenflex 1 60*);

(ii) citrates; International Patent Application No. PCT/GB 93/01689 discloses a range of doubly esterified hydroxycarboxylic acids having at least 3 ester groups in its molecule. A particularly preferred example from that disclosure is acetyl tri-n-butyl citrate (Estaflex*). Further citrates of the formula:

where $R_1$ is hydrogen or $C_{1-10}$ alkyl, and $R_2$ is $C_{1-10}$ alkyl, $C_{1-10}$ alkoxy or $C_{1-10}$ alkoxyalkyl. When $R_1$ and $R_2$ are alkyl each is preferably selected from straight or branched chain, methyl, ethyl, propyl, butyl, pentyl, hexyl, iso-propyl, isobutyl, or ethoxy, propoxy, butyoxy, butoxyethyl, butoxy-isopropyl and butoxyethoxy are encompassed by the present invention. Particular examples are : triethylcitrate, trimethylcitrate, n-butyl tri-n-hexylcitrate (Citroflex B6), tri-n-butylcitrate (Citroflex 4).

(v) fumarates;

(vi) glutamates such as diester ether alkyl (Plasthall 7050*);

(vii) adipates, such as those of the formula $R_1$—O—C(O)—(CH$_2$)$_4$—C(O)—OR$_1$ where $R_1$ and $R_2$ which may be the same or different are $C_{2-12}$ alkyl (e.g. butyl), $C_{2-12}$ alkoxy (e.g. butoxyethoxy), $C_{2-12}$ alkoxyalkyl (e.g. butoxyethyl), for example, di-2-ethylhexyl adipate (Reomol DOA*), di-isodecyl adipate, di-isononyl adipate, dioctyl adipate; The esterified radicals may be for example $C_1$–$C_{12}$ alkyl, aryl, aralkyl or aralkyl.

(viii) Sebacic acid derivatives of the formula $R_1$—O—C(O)—(CH$_2$)$_8$—C(O)—O—R$_1$ where $R_1$ is $C_{2-15}$ alkyl or $C_{2-15}$ alkoxyalkyl, for example, di-octyl sebacate, di-dodecyl sebacate, di-butoxyethyl sebacate, or di-n-butyl sebacate;

(ix) Azelaic acid derivatives of the formula $R_1$—O—C(O)—(CH$_2$)$_7$—C(O)—R$_1$ where $R_1$ is $C_{2-12}$ alkyl, benzyl, or $C_{2-12}$ alkoxy-alkyl, for example, di-n-butyl azelate and di-i-octyl azelate;

(B) high-boiling glycols, polyglycols, polyoxyalkylenes and glycerol each optionally substituted and optionally terminally esterified:
  (i) high molecular weight glycols such as triethylene glycol diacetate (Estol 1 593*), triethylene glycol caprylate (Plasthall 4141*), alkyl ethers/esters of general formula $R_2$—(O—$CH_2$—$CH_2$—O—$CH_2$—$CH_2$ O)$_n$—$R_1$ (optionally the repeating ethoxy can be isopropoxy) where n is 2 or more, for example Morton TP90B* where $R_2$ is $C_4H_9$— and n is 2, Reomol BCF where $R_1$ is —C(O)—alkyl, $R_2$ is $C_4H_9$— and n is 2, Reomol BCD where $R_1$ is —C(O)—alkyl, $R_2$ is $C_4H_9$— and n is 2, Morton TP759*, compounds of such formula where $R_1$ is —C(O)—$C_mH_{2n+1}$ particularly up to m=20, e.g. lauryl when m is 1 2, palmitate when m is 15 or oleate when m is 15 and unsaturated, stearyl when n is 17, $R_2$ is sorbitan and n is up to 20, for example Tween 80 in which $R_2$ is sorbitan monooleate, $R_1$ is lauryl and n is 20; and such compounds containing irregularly spaced ether linkages, for example the compounds of the formula above in which $R_1$ hydrogen, $R_2$ is alkylphenyl where the alkyl is $C_{2-12}$ alkyl, and n is 2 to 100, for example, Igepal CA210* where the alkyl is $C_8$ alkyl and n is 2, Igepal CA510* which is the same as CA210 except that n is 5, Triton X-1 00* and Triton X-405* which is the same as Igepal CA510* except that n is 10 and 40 respectively, Plasthall CPH27N, CPH30N and CPH39 where $R_1$ is hydrogen, R2 is $CH_3$—$(CH_2)_{10}$—C(O)— and n is 10, 5 and 15 respectively, Plasthall CPH39N and CPH41N in which $R_1$ is hydrogen, $R_2$ is $CH_3$—$(CH_2)_7$—CH=CH—$(CH_2)_7$—C(O)— and n is 5 and 15 respectively; PEG 2000, PEG 6000 and PEG 1 0000 where $R_1$ and $R_2$ are both hydrogen and n is 50, 150 and 200 respectively;
  (ii) examples of polyglycols are polypropylene glycol) (PPG 100*, PPG 725*, PPG 425*), polyethylene) glycol (PEG 300*, PEG 200*);
  (ii) examples of glycerol derivatives are glycerol tricaprolate, glycerol tributyrate;
  (v) pentaerythritols and derivatives;

The acid-derived radical of the ester typically contains 2–10 carbon atoms.

(C) sulphonic acid derivatives such as toluenesulphonamide (Ketjenflex 15*, Ketjenflex 8*, Ketjenflex 7*, Ketjenflex 3*);

(D) epoxy derivatives such as the compounds of formula $CH_3$—$(CH_2)_n$—A—$(CH_2)_n$—R in which the A is an alkene containing one or more double bonds (i.e. unsaturated fatty acids), n is up to 25 and R is $C_{2-15}$ alkyl, epoxidised esters of fatty acids, epoxidised soya bean oil, epoxidised linseed oils, epoxidised octyl tallate, epoxidised glycololeate, e.g. Lankro EDG*, Lankro GE*, Paraplex G60* Paraplex G62* Plasthall E50* Rheoplas 39* and Lankro L*;

(E) substituted fatty acids such as palmitates, stearates, oleates, ricinoleates and laurates, for example, sorbitan monolaurate, sorbitan monooleate, poly(oxyethylene) (20)Sorbitan monolaurate (Tween 20*), poly (oxyethylene)(4)lauryl ether (Brij 30*), butyl acetyl ricinoleate (BAR*);

(F) phosphoric acid derivatives (phosphates), particularly compounds of the formula $O=P(OR)_3$ where R is alkyl, alkoxyalkyl, phenyl or phenylalkyl for example, isopropyl-phenyl. Particular examples are: phosphate ester (Reomol 249*), tri-isopropyl phenyl phosphate (Reofos 95*); and phosphonic acid derivatives and phosphates;

(G) chlorinated paraffins such as Cereclor 56L*, Cerechlor 552;

(H) polymeric esters such as those of the formula —O—C(O)—$R_1$—C(O)—O—$R_2$—O— in which $R_1$ and $R_2$ are both independently $C_{2-12}$ alkyl, or $R_2$ may be derived from a diol such as 1,2-propanediol, 1,3-butanediol, 1,4-butanediol or 1,6-hexanediol; for example:
  (i) glutaric polyesters (polyester glutarates) having molecular weights from 2000 to 20,000, e.g. Plasthall 550*, Plasthall 7046*, Plasthall 7092* Paraplex P550* Paraplex P7035*;
  (ii) adipic polyesters (polyester adipates) having a molecular weight from 200 to 20000, for example, Plasthall 643*, Plasthall 650*, polypropylene) adipate for example LANKROFLEX PLA*, LANKROFLEX PPL*, LANKROFLEX PPA/3*, Paraplex G56* Paraplex G59* Diolpate 214*, Diolpate 917*;
  (iii) succinic polyesters;
  (iv) sebacic polyesters (polyester sebacate) having a molecular weight from 4000 to 10000, preferably 8000, for example, Plasthall 1070*;
  (v) Diolpate OL1696*, Diorex 570*;
  (vi) lactone copolymers of the formula [—O—C(O)—$R_1$—C(O)—O+($R_2$—O)]$_m$—[(C(O)—$R_3$—O—)]$_n$ where $R_1$ and $R_2$ are both independently $C_{2-12}$ alkyl, or $R_2$ may be derived from a diol such as 1,2-propanediol, 1,3-butanediol, 1,4-butanediol or 1,6-hexanediol. and $R_3$ is —$(CH_2)_5$—(based on caprolactone);
  (vii) polyesters such as Reoplex 346* Reoplex 1102*, Reomol MD (ester of mixed adipic, glutaric and succinic acids with isodecanol), polycaprolactone triol (PCL Triol (300)*);

(J) Wolflex-But*;

Generally it is preferred that the plasticiser should be biodegradable.

Preferred plasticisers are the polymeric esters, high-boiling glycols, polyglycols, polyoxyalkylenes and glycerol each optionally substituted and optionally terminally esterified, epoxidised soyabean oils, adipates, sebacates, phosphate esters, phthalates, citrates, castor oil, chlorinated paraffins and toluene sulphonamide derivatives.

Particularly preferred are epoxidised natural oils, phthalate derivatives, polypropylene adipates, phosphoric acid derivatives, polymeric esters. Especially polypropylene glycol adipate, substituted polyethylene glycol, polyester glutarate and epoxidised soyabean oil.

Plasticisers which are particularly preferred for conferring improved impact properties are high molecular weight glycols of general formula $R_2$—(O—$CH_2$—$CH_2$—O—$CH_2$—$CH_2$—O)$_n$—$R_1$, for example Reomol BCD, adipates, for example di-isodecyl adipate, mixed polyesters, for example Reomol MD, polyester glutarate, for example Paraplex 550, and citrates.

In a further aspect of the invention the polyester composition may contain at least two plasticisers selected from those defined herein. In a yet further aspect of the present invention the polyester composition may contain one or more plasticisers selected from those defined herein and may additionally contain one or more plasticisers previously known to plasticise polyhydroxyalkanoates, for example, citrates containing doubly esterified hydroxycarboxylic acids having at least 3 ester groups in the molecule, glycerol triacetate and glycerol diacetate. Of particular interest is a polyester composition containing as plasticisers acetyl tri-n-butyl citrate (Estaflex*) and any of the plasticisers defined herein, especially acetyl tri-n-butyl citrate (Estaflex*) and epoxidised soya bean oil.

The following examples are included to demonstrate preferred embodiments of the invention. It should be appreciated by those of skill in the art that the techniques disclosed in the examples which follow represent techniques discovered by the inventor to function well in the practice of the invention, and thus can be considered to constitute examples of preferred modes for its practice. However, those of skill in the art should, in light of the present disclosure, appreciate that many changes can be made in the specific embodiments which are disclosed and still obtain a like or similar result without departing from the spirit and scope of the invention.

EXAMPLES

Example 1

Behavior of Linear PHAs During Extrusion Coating

Figure 2:
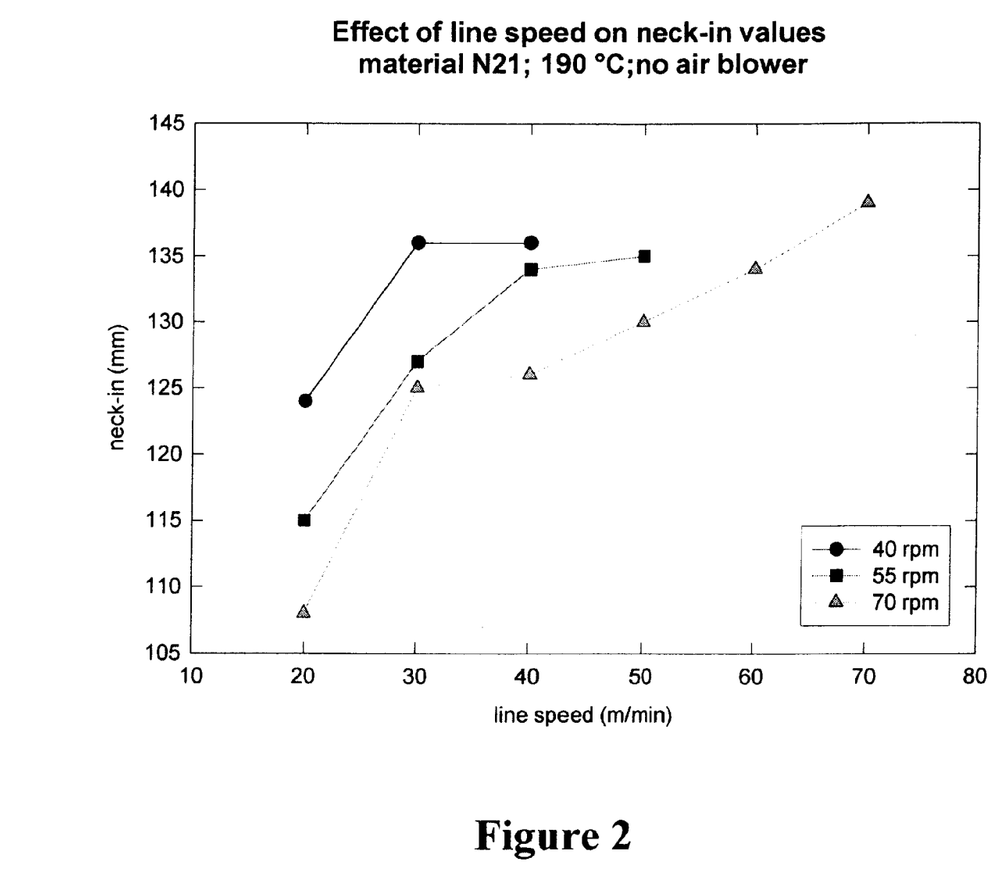
FIG. 2 illustrates the effect of line speed on neck-in values for linear PHA.

BIOPOL (polyhydroxybutyrate-co-valerate copolymer containing 8% valerate; available from Monsanto Company) was extrusion coated on board using different line speeds and different extruder outputs. The results showing neck-in as a function of line speed, are presented in FIG. 2. The neck-in is determined as the mathematical difference between the width of the die and the width of the BIOPOL coating on the board. The line speed is controlled by adjusting the speed of the chill roll which is stretching the polymeric material leaving the die. BIOPOL D400GN was used having a molecular weight of about 325,000. The set temperature of the extruder was 190 deg.C. The die had a width of 20 cm. The polymer was coated on a chill roll maintained at a temperature of 60 deg.C. The air gap was 15 cm and the die gap was about 0.5 mm.

For each experiment, line speed was progressively increased until the occurrence of draw resonance was observed. This was apparent as an instability in the behavior of the melt curtain resulting in variation in the thickness of the polymer coating. It was found that the neck-in depends on both the line speed and the extruder output. In all cases, neck-in was greater than 50% of the total width of the die. The maximum line speed attainable before the occurrence of draw resonance depended upon extruder output and can be determined from FIG. 2 as the last point of each curve.

Example 2

The Effect of Branched Material on Neck-In

Coating experiments were carried out using essentially the same equipment and conditions described in Example 1. In these experiments, the behavior of linear and branched PHAs were compared. Branched BIOPOL was obtained by reaction of linear BIOPOL with DCP in a twin screw extruder. All branched materials described here and in subsequent examples were prepared on Leistritz Micro 18 twin screw extruder, co-rotated rotated screws, L/D=30/1, standard devolatization (no vacuum). The diameter of the screw was equal to 2.5 cm. The temperature is the extruder was between 150 deg.C in the first zone near the feed section to 165 deg.C in the die itself. The speed of screw when operating at between 80 and 120 rpm had no effect on the structure of the resulting product. Evidence of branching was clear from the analysis of the material. Intrinsic viscosity data showed a deviation from the behavior expected for linear molecules, explainable by the presence of a branched structure. Extensional flow measurements on the melt demonstrated the existence of strain hardening, also explainable by the presence of branched structures within the polymer. The results are based on BIOPOL having an original molecular weight of about 450,000. After reaction with peroxide, the molecular weight remained almost unchanged, due presumably to the simultaneous processes of thermal degradation and branching.

Figure 3:
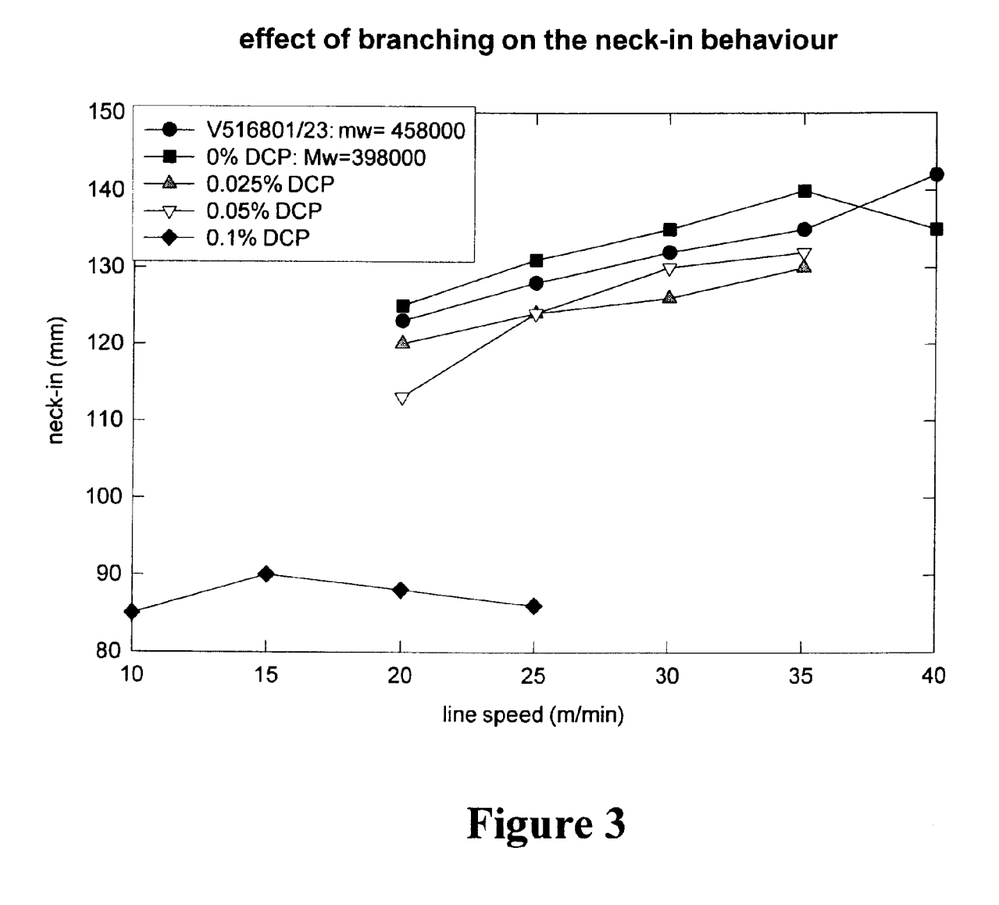
FIG. 3 illustrates the influence of PHA branching on the neck-in behavior of PHA.

The results of these experiments are shown in FIG. 3. Both of the samples, V516801 and 0% DCP, are linear polymeric molecules with different molecular weights, respectively equal to 458,000 and 398,000. Introducing branching into PHA resulted in decreased neck-in in a way which depended on the amount of DCP used in the reaction, hence on the extent of branching present in the polymeric structure. Increasing the number of branches resulted in an increase in the elasticity of the material, as deduced from die swell measurements, and led to a decrease in the neck-in of the material. The branched structure also induced a strain hardening effect in transient extensional flow. A strong decrease was observed when increasing the amount of DCP form 0.05% to 0.1%. Branched materials obtained using higher DCP concentrations were difficult to process at reasonable line speeds under these conditions.

Example 3

The Effect of Branched PHA on Age-Related Embrittlement

Samples were prepared by spraying pellets of Biopol (D400G) with a solution of DCP in methanol. The pellets were mixed thoroughly during the spraying operation to ensure even coverage by the DCP/methanol solution. Three different batches of treated pellets were prepared corresponding to 0.1, 0.2 and 0.3 wt % loadings of DCP on Biopol, respectively. The three batches of pellets and control untreated pellets were injection molded on an Arburg 221/150 injection molding machine (20 ton clamp force, 1.5 oz. maximum injection volume) using an injection pressure of 800 psi, screw speed of 120 rpm, zone temperatures of Z1=160 deg.C., Z2=170 deg.C. and Z3=170 deg.C.), mold temperature of 60 deg.C. and total cycle time of about 40 seconds into Type I ASTM D638 test specimens of ⅛" thickness. The tensile properties of the test pieces were measured according to the ASTM D638 method using a crosshead speed of 2"/min and strain gauges 2" apart. Elongation at break results are given in the following table for samples as molded, and 1, 2 and 3 months after molding.

|  | Elongation at Break (%) | | | |
| --- | --- | --- | --- | --- |
|  | 0 day | 1 month | 2 month | 3 month |
| 0% DCP | 37.9 | 21.3 | 12.8 | 11.6 |
| 0.1% DCP | 67.4 | 21.6 | 30.6 | 32.4 |
| 0.2% DCP | 85.1 | 44.6 | 39.7 | 28.4 |
| 0.3% DCP | 66.9 | 39.5 | 39.7 | 32.7 |

Example 4

Figure 4:
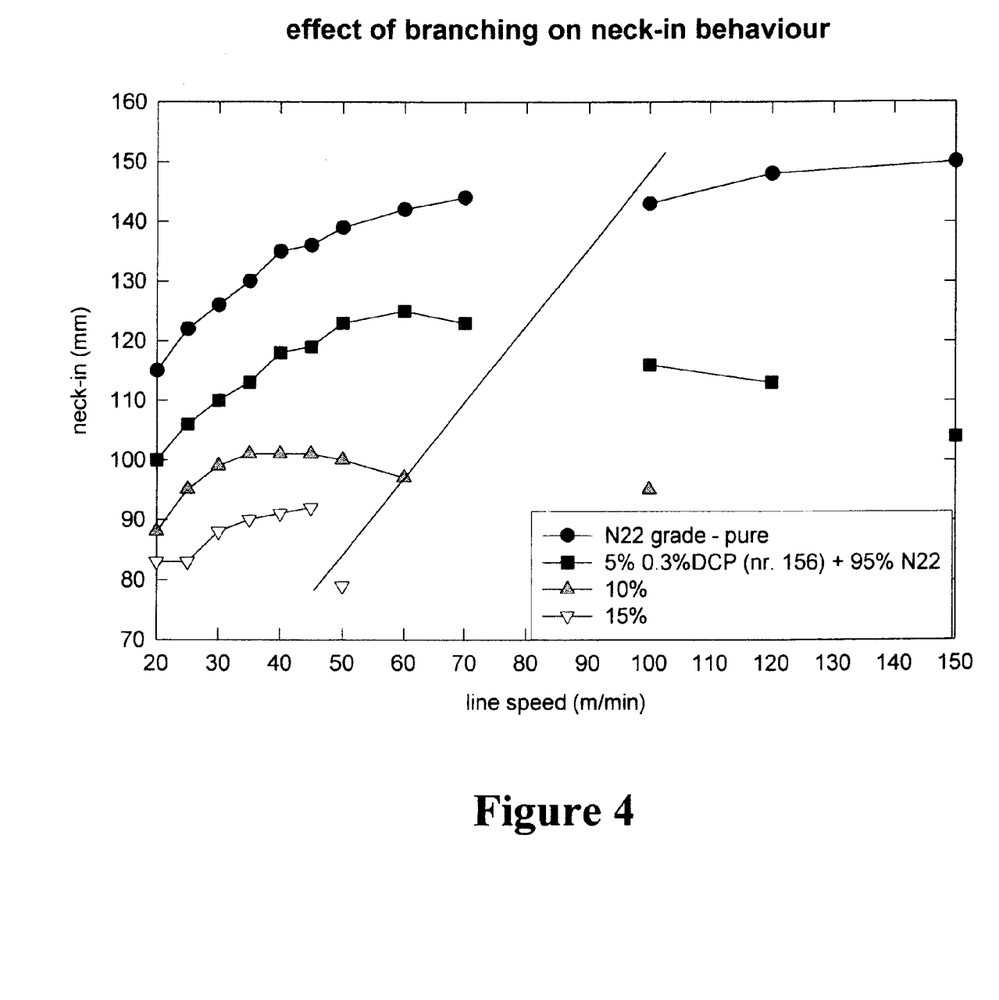
FIG. 4 illustrates the effect of PHA branching on neck-in behavior of PHA with and without the presence of an air blower.

The Effect of Air Blower on Attainable Line Speeds for Branched and Linear BIOPOL In FIG. 4, neck-in values were obtained using an air blower during extrusion coating of blends of branched and linear BIOPOL. The air blower was installed about 2 cm from the molten web. Data on the left side of the diagonal line were obtained without the air blower, data points on the right side of the line were obtained using the air blower. With the air blower, much higher line speeds were attainable and the neck-in was generally reduced. The experiments were performed similar to those described in Example 2. However, the base material used in the blend was linear BIOPOL, grade N22, with a molecular weight around 300,000. The branched material was based on V516801, with a molecular weight of around 420,000 after branching. The amount of DCP used to produce the branched material was 0.3%. The fraction of branched material in the blend ranged from 0% and 15%. The set point of the extruder was 190° C.; the air blower pressure was equal to 2 bar. The air temperature was around 50° C.

Example 5

Effect of Air Blower on Neck-In of Linear PHA

Figure 5:
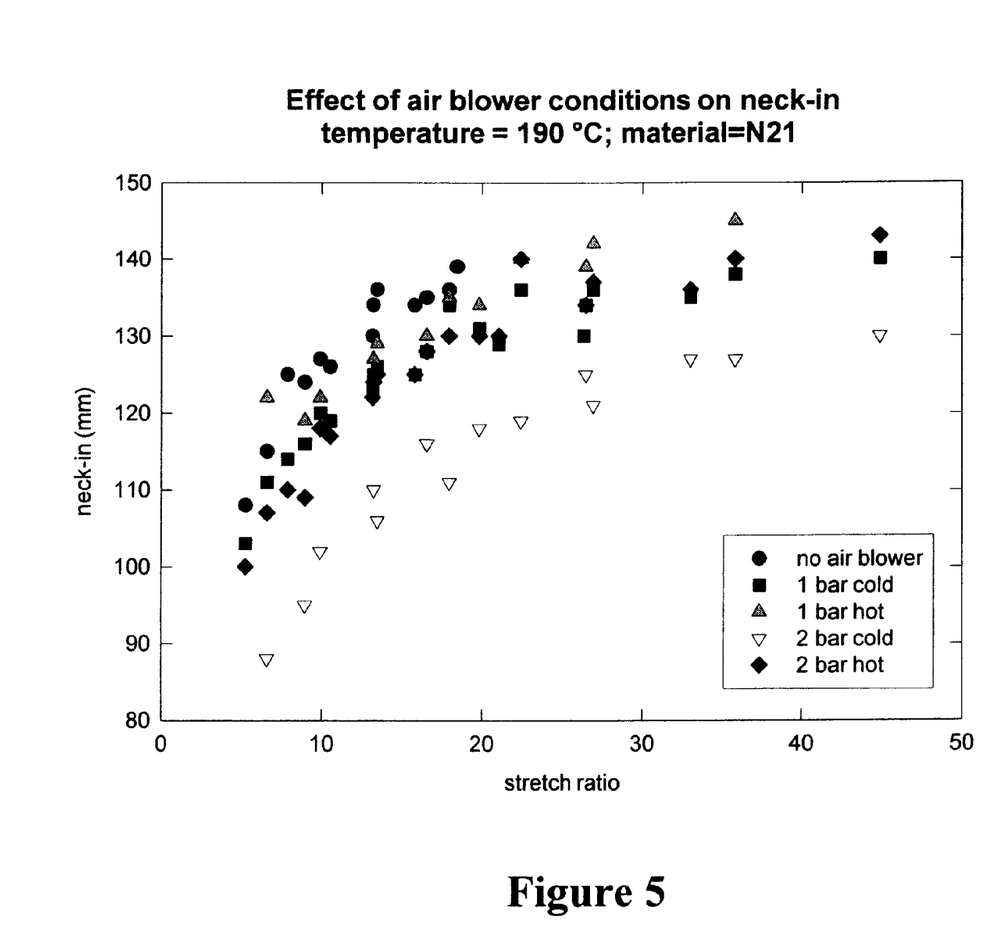
FIG. 5 illustrates the effect of air blower conditions on the neck-in behavior of PHA.

Additional experiments were performed to further evaluate the influence of the air blower on extrusion coating of linear PHAs. Using the same material described in Example 1, a similar extrusion coating test was carried out. The temperature of the air from the blower was either 30 deg.C. ("cold" air) or 60 deg.C. ("hot" air). The pressure of the air was either 1 or 2 bar. The results of these experiments are shown in FIG. 5. The neck-in values are plotted as a function of stretch ratio which is equal to the ratio of the line speed over the extruder output speed. The stretch ratio is a critical machine parameter determining the neck in behavior. An increase of the line speed leads to a more pronounced stretching of the material. As a result, the material has a greater tendency to neck. The use of the air blower reduced the neck-in values in a way which depended on both the applied air pressure and the air temperature. The most significant neck-in reductions in these experiments were observed when air pressure was 2 bar and air temperature was 30 deg.C.

Example 6

Effect of the Air Blower on Draw Resonance Speed for Linear PHA

Figure 6:
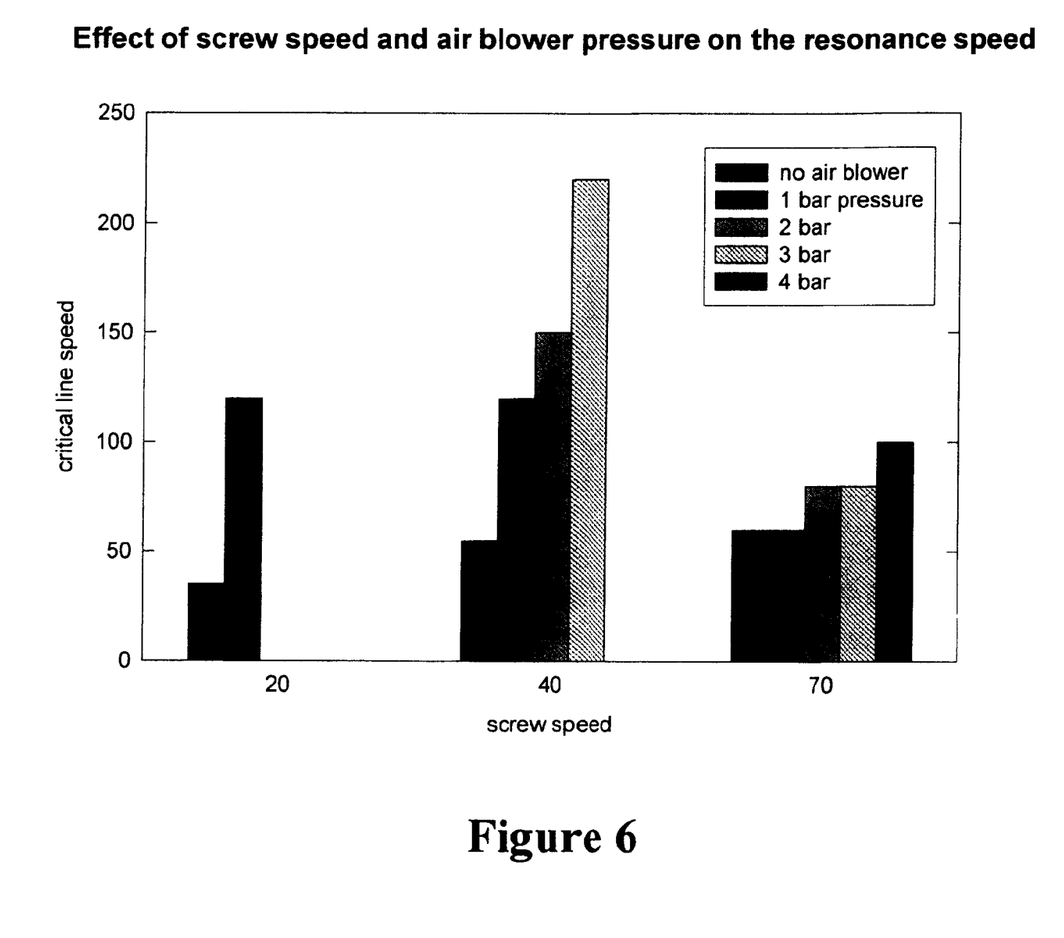
FIG. 6 illustrates the effect of screw speed and air blower pressure on attainable line speeds.

Coating experiments were carried out using essentially the same conditions as described in Example 5. Air at a temperature of 55° C. was directed against the polymer web. The air blower was about 2 cm from the polymer web. The pressure was from 1–4 bar. The extruder output was manipulated by varying the screw speed from 20–70 rpm. The results of this experiment are presented in FIG. 6. The use of an air blower clearly increased critical line speeds. Without the use of the air blower, the maximum line speed was around 50 m/min. With the use of an air blower, the maximum line speed was increased to values above 200 m/min. The effect of the air blower depended on both the extruder output and the air pressure. Increasing the air pressure resulted in an increase in the maximum line speed. At a constant air pressure, the effect of the air blower decreased with increasing extruder output. However, in all cases, the act of blowing air against the polymer web increased the maximum line speed that could be attained.

Example 7

Adhesion of Linear PHA

BIOPOL coating experiments were performed to evaluate polymer/substrate adhesion. BIOPOL D400G with a molecular weight of 300,000 was coated on paper board of 210 gr/m$^2$ onto a chill roll maintained at a temperature of 60° C. The chill roll was coated with a Teflon layer applied as a spray (layer was a few nm thick). The set temperature of the extruder was 190 deg.C., the die width was 20 cm, the air gap was 15 cm, and the die gap was 0.5 mm.

Figure 7:
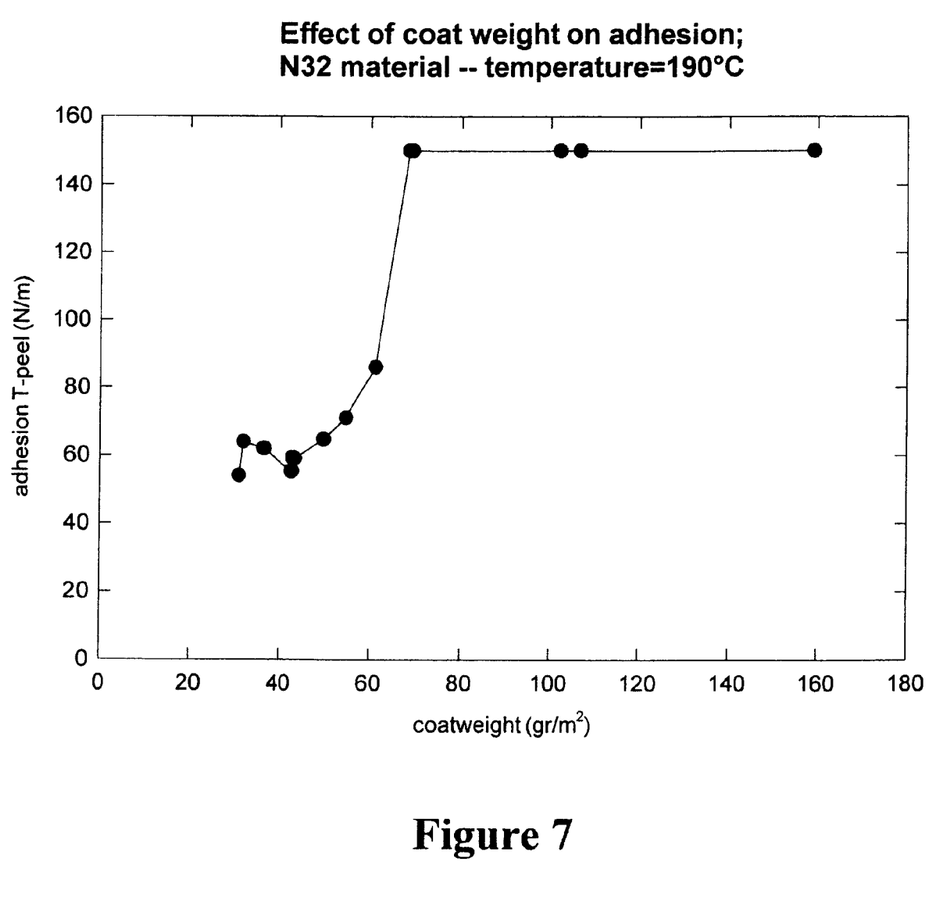
FIG. 7 illustrates the effect of coat weight on adhesion of PHA to substrate.

The effect of coat weight on adhesion of BIOPOL to paper is illustrated in FIG. 7. The adhesion was measured by performing a peel test according to ASTM D1876 (T-peel test). The peeling forces were recorded with an INSTRON Tensile Testing machine. The peeling angle was maintained at 90 degrees throughout the process and peeling was carried out in the machine direction. The number of peel tests was five per sample. At higher coat weights, the adhesion reached a plateau value which corresponds to fiber tear. This indicates that the material does not fail at the interface between the polymer and the paper but that the failure occurs within the paper itself. As the coat weight decreases lower adhesion values were observed. The adhesion values drop below the plateau value at a critical coat weight of about 70 gr/m$^2$. Similar results were obtained using the branched materials and using batches of D400GN with comparable Mw as tested here.

Example 8

Effect of the Air Blower on Adhesion of Linear PHA.

Figure 8:
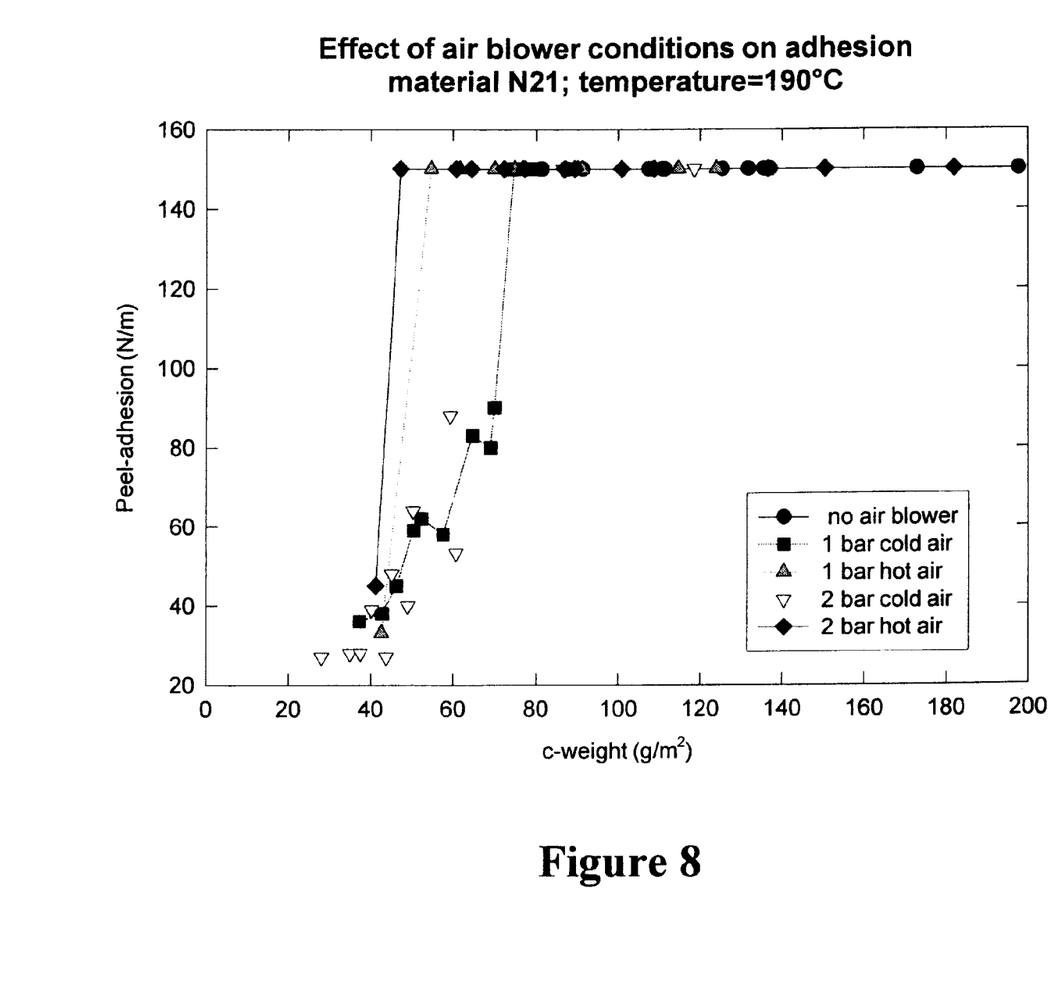
FIG. 8 illustrates the effect of air blower conditions on adhesion of PHA to substrate.

Coating experiments were carried out using essentially the conditions described in Example 7. In this experiment, however, an air blower was used. The temperature of the air was either 30 ("cold" air) or 60° C. ("hot" air) and the pressure was 1 or 2 bar. The material used was D400G, with a molecular weight of about 320,000. The results of the test are shown in FIG. 8. Using the air blower with cold air at a pressure of 1 and 2 bar did not have any effect on the critical coat weight. Critical coat weight remained about 70 gr/m$^2$. Increasing the temperature of the air, however, resulted in a decrease in the critical coat weight to a lower value. This corresponds to a better adhesion of the polymer to the board. At an air temperature of 60° C., the critical coat weight is reduced from 70 gr/m$^2$ to a value of 45 gr/m$^2$. Thus, the temperature of the air can be manipulated in order to achieve better adhesion of the polymer to the surface of the board at lower coat weights.

All of the composition and methods disclosed and claimed herein can be made and executed without undue experimentation in light of the present disclosure. While the compositions and methods of this invention have been described in terms of preferred embodiments, it will be apparent to those of skill in the art that variations may be applied to the compositions and in the steps or in the sequence of steps of the method described herein without departing from the concept, spirit and scope of the invention. More specifically, it will be apparent that certain agents which are both chemically and physiologically related may be substituted for the agents described herein while the same or similar results would be achieved. All such similar substitutes and modifications apparent to those skilled in the art are deemed to be within the spirit, scope and concept of the invention as defined by the appended claims.

What is claimed is:

1. A method of making branched PHA, comprising melting PHA in the presence of 0.001–0.5% peroxide at a temperature above the melting temperature of the PHA and above the decomposition temperature of the peroxide.

2. The method of claim 1, wherein the peroxide is dicumyl peroxide, dibenzoyl peroxide, or 2,5-bis(t-butylperoxy)-2,5-dimethylhexane.

3. Branched PHA produced according to any one of claims 1–2.

* * * * *